(12) United States Patent
Kihara

(10) Patent No.: US 6,185,018 B1
(45) Date of Patent: Feb. 6, 2001

(54) HOLOGRAPHIC STEREOGRAM PRINTING SYSTEM

(75) Inventor: Nobuhiro Kihara, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/221,562

(22) Filed: Dec. 28, 1998

(30) Foreign Application Priority Data

Jan. 6, 1998 (JP) .................................................. 10-001134
Sep. 24, 1998 (JP) .................................................. 10-270217

(51) Int. Cl.[7] .............................. G03H 1/26; G03H 1/02; G03H 1/00
(52) U.S. Cl. ................................ 359/23; 359/22; 359/28; 359/30; 359/34
(58) Field of Search ................................ 359/23, 22, 30, 359/34, 28; 385/31, 33, 34

(56) References Cited

U.S. PATENT DOCUMENTS 4,783,133 * 11/1988 Chen ..................................... 350/376
4,918,583   4/1990 Kudo et al. ............................ 362/268

FOREIGN PATENT DOCUMENTS 0 593 265   4/1994 (EP) .
0 731 485   9/1996 (EP) .
0 814 387  12/1997 (EP) .
WO 92/01976  2/1992 (WO) .

* cited by examiner

Primary Examiner—Audrey Chang
Assistant Examiner—Jennifer Winstedt
(74) Attorney, Agent, or Firm—Frommer Lawrence & Haug, LLP; William S. Frommer

(57) ABSTRACT

A holographic stereogram printing apparatus that is able to formulae a holographic stereogram superior in light utilization efficiency and in picture uniformity. The holographic stereogram printing apparatus causes the laser light from a laser light source 31 to fall on a picture display device 41 to illuminate the light transmitted through the display device 41 as object light on a holographic recording medium 30. The holographic stereogram printing apparatus also causes part of the laser light prior to being transmitted through the display device 41 to be illuminated as reference light on the holographic recording medium 30 to form the element holograms sequentially on the holographic recording medium 30. In the holographic stereogram printing apparatus, a light integrator 63 for uniforming the intensity of light incident on the display device 41 is provided on the optical path of the laser light proceeding towards the display device 41.

6 Claims, 13 Drawing Sheets

HOLOGRAPHIC STEREOGRAM PRINTING SYSTEM

BACKGROUND OF THE INVENTION

1. Field of the Invention

This invention relates to a holographic stereogram printing or formulating system for producing a holographic stereogram that is able to recognize an actually imaged picture or a computer-generated picture three-dimensionally.

2. Description of the Related Art

A holographic stereogram is formulated by sequentially recording a large number of pictures, obtained on sequentially imaging an object from different viewing points, as original pictures, on a sole holographic recording medium, in the form of strip-shaped or dot-shaped element holograms.

In the case of a holographic stereogram having the parallax information only in the horizontal direction, for example, plural original pictures 101a to 101e, obtained on sequentially imaging an object from different viewing points in the horizontal direction, are sequentially recorded on a holographic recording medium 102 in the form of strip-shaped element holograms.

If the holographic stereogram is viewed with one eye from a given position, a two-dimensional picture, as a set of the picture information of a portion of the respective element holograms, is viewed, whereas, if the eye position is moved in the horizontal direction, a two-dimensional picture, as a set of the picture information of another portion of the respective element holograms, is viewed. Thus, if a viewer observes the holographic stereogram with both eyes, the two-dimensional pictures as seen by the left and right eyes differ slightly from each other because of the slight difference in the positions of the left and right eyes in the horizontal direction. Thus, the viewer feels the parallax, with the reproduced picture being recognized as a three-dimensional picture.

Meanwhile, in formulating a hologram of high picture quality, it is known to be effective to place a diffusion plate in the vicinity of picture displaying means. Among reference materials, there are "Endo and Yamaguchi et al, 23rd Picture optical Conference 1992 p 317 ff" and "Michael Klug et al, 1993 proc SPIE#1914 Practical Holography VII,".

However, if a diffusion plate is arrayed in the vicinity of the picture display means, there is observed a nonuniform noise at an infinitely remote position in the produced hologram. Attempts to move the diffusion plate to reduce the noise is proposed in Japanese Laying-Open Patent 8-1722382. However, if there are a number of movement units, there is raised a problem in connection with vibration resistance. If the diffusion plate is used, the light utilization efficiency is lowered.

SUMMARY OF THE INVENTION

It is therefore an object of the present invention to provide a holographic stereogram formulating apparatus of a high light utilization efficiency whereby the noise positioned in an infinitely remote point can be eliminated and a high picture quality hologram can be produced, and which renders it possible to utilize an inexpensive low-output laser.

According to the present invention, there is provided a holographic stereogram printing apparatus including a laser source for radiating a laser light beam, display means for displaying a picture in association with coordinate positions of a holographic recording medium and an optical system for collecting the laser light from the laser light source transmitted through the display means as an object light on the coordinate positions of the holographic recording medium and for simultaneously illuminating part of the laser light prior to being transmitted through the display means as reference light on the holographic recording medium for sequentially formulating the strip- or dot-shaped element holograms on the holographic recording medium. The optical system includes a light integrator lying on the optical path proceeding to the display means for uniforming the intensity of light illuminated on the display means.

With the holographic stereogram printing apparatus according to the present invention, parallelism of the object light can be optimally controlled without using a diffuser, as a result of which the light wasted due to slits etc can be minimized.

With the holographic stereogram printing apparatus according to the present invention, it is unnecessary to enlarge the beam by the objective lens and the pinholes, in contradistinction from the conventional system, thus further improving the light utilization efficiency.

Also, with the holographic stereogram printing apparatus according to the present invention, picture display means can be illuminated evenly, while the diffusion plate is not used, thus significantly reducing the noise in the picture.

Thus, with the holographic stereogram printing apparatus according to the present invention, a holographic stereogram of high picture quality can be produced even with the use of the inexpensive low-output laser.

DESCRIPTION OF THE PREFERRED EMBODIMENTS

Figure 1:
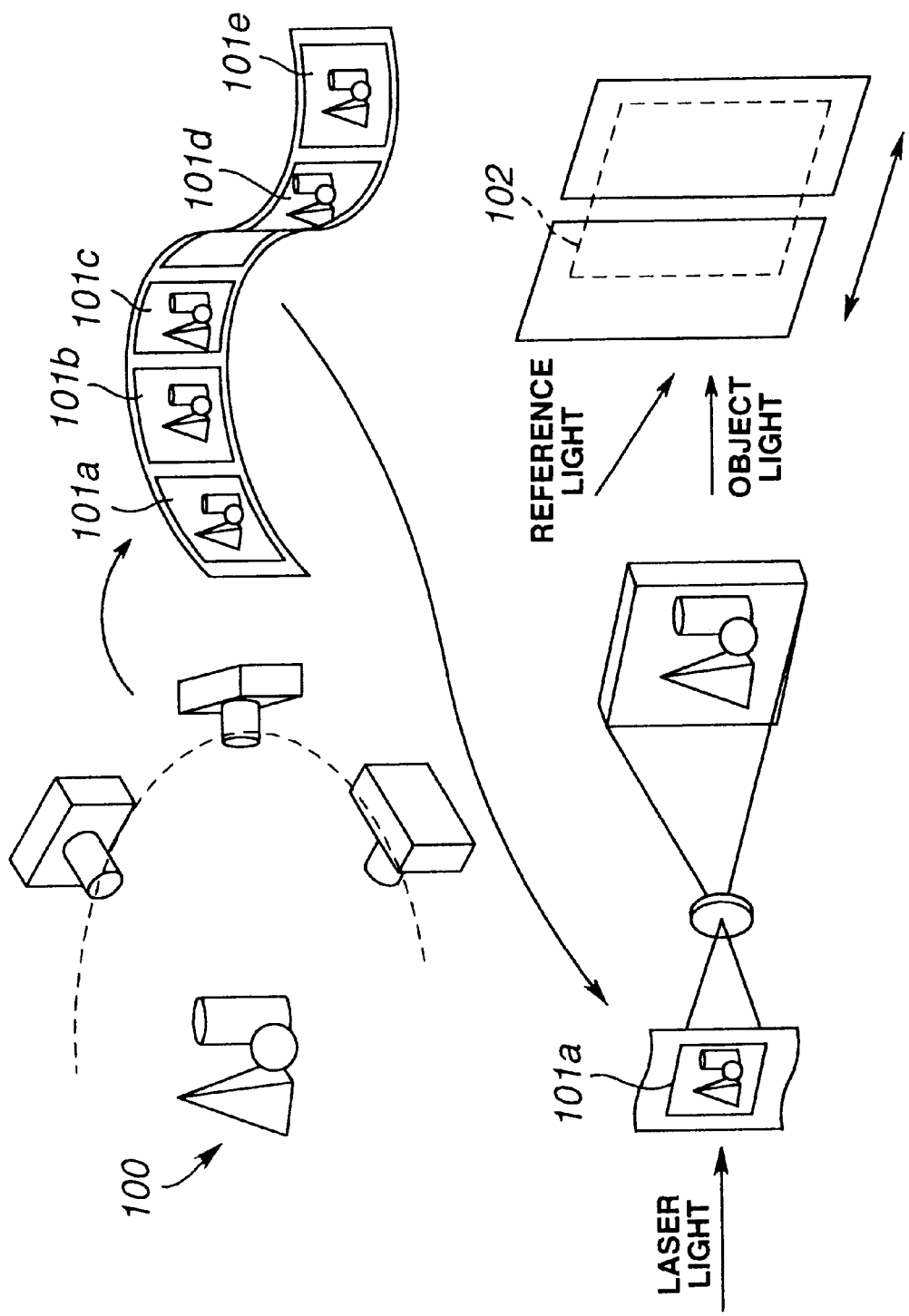
FIG. 1 is a schematic view showing a method for formulating a holographic stereogram.

Referring to the drawings, preferred embodiments of the present invention will be explained in detail. The embodiments given below are merely illustrative and are not intended for limiting the invention.

First, an illustrative structure of a holographic stereogram formulating system for formulating a holographic stereogram is explained. Here, a holographic stereogram formulating system for formulating a holographic stereogram to which is accorded the parallax information in the horizontal direction by recording plural strip-shaped element holograms on a sole recording medium is taken as an example. The present invention can, of course, be applied to a holographic stereogram formulating system for formulating a holographic stereogram to which the parallax information of both the horizontal direction and the vertical direction is accorded by recording dot-shaped plural element holograms on a sole recording medium.

Figure 2:
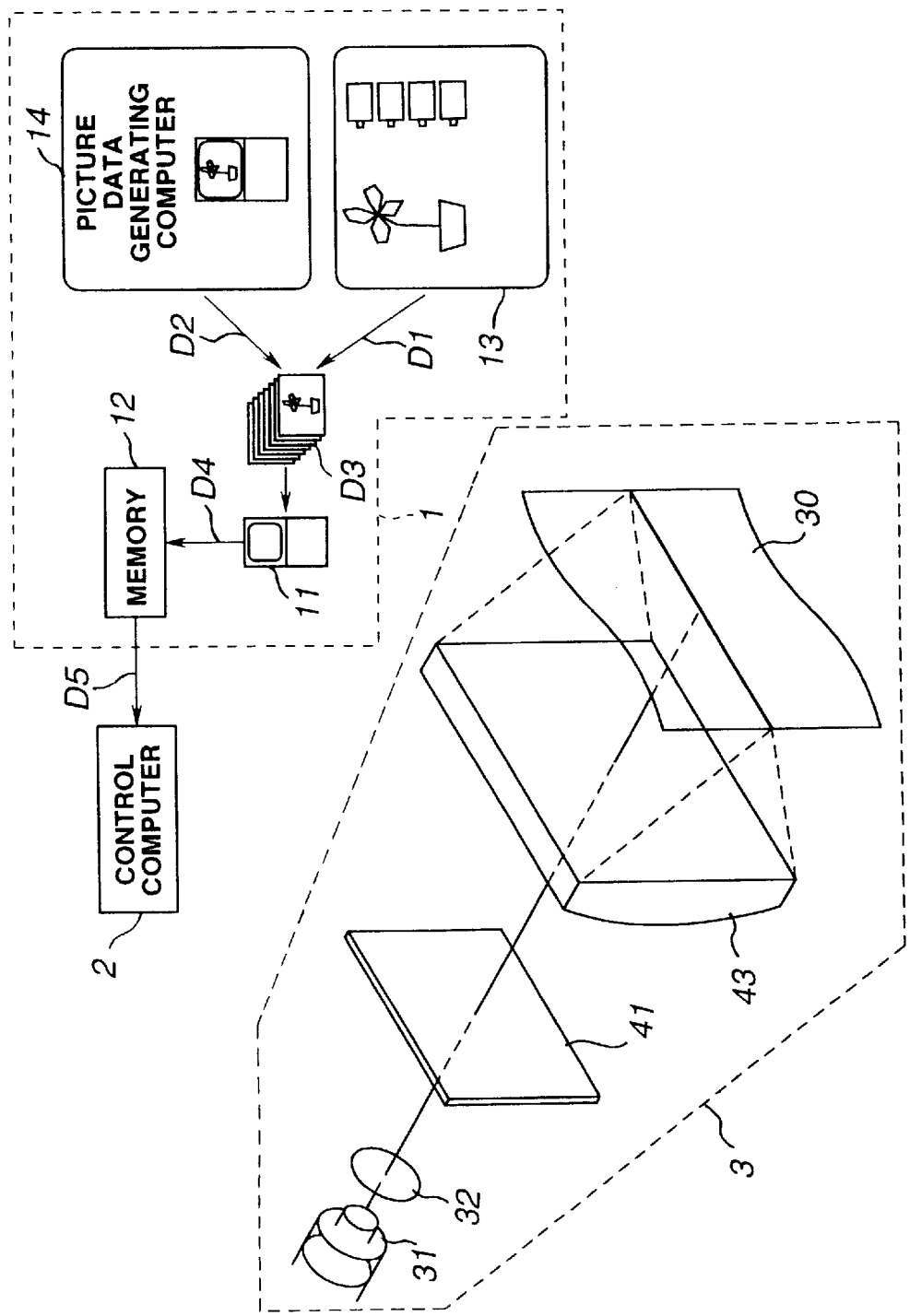
FIG. 2 shows an illustrative structure of a holographic stereogram formulating system.

The holographic stereogram formulating system, as now explained, is a system for formulating a so-called one-step holographic stereogram in which a recording medium, having recorded thereon interference fringes of the object light and the reference light, directly serves as a holographic stereogram. The system includes a data processing unit 1 for processing picture data to be recorded, a control computer 2 for controlling the entire system, and a holographic stereogram printing device 3 having an optical system for formulating the holographic stereogram, as shown in FIG. 2.

The data processing unit 1 generates a string of parallax pictures D3 based on plural picture data D1, inclusive of the parallax information supplied from a parallax picture string imaging device 13 having s multi-eye camera or a movable camera or plural picture data D2 including the parallax information generated by a picture data generating computer 14.

The plural picture data D1, including the parallax information supplied from the parallax picture string imaging device 13, are picture data for plural pictures obtained on imaging an object from plural different viewing points lying in the horizontal direction.

The plural picture data D2, including the parallax information generated by the picture data generating computer 14, are picture data such as plural CAD (computer aided design) pictures or CG (computer graphics) pictures formulated by sequentially according the parallax in the horizontal direction.

The data processing unit 1 processes the parallax pictures D3 with pre-set picture processing for holographic stereogram by a picture processing computer 11. The picture data D4, processed with pre-set picture processing, are stored in a storage device 12, such as a memory or a hard disc.

When recording a picture on a holographic recording medium, the data processing unit 1 reads out pictures in good order on the picture basis from the picture data D4 recorded on the recording device 12 to send picture data D5 to the control computer 2.

The control computer 2 drives the holographic stereogram printer device 3 to sequentially record a picture corresponding to the picture data D5 sent from the data processing unit 1 on a holographic recording medium 30 set in the holographic stereogram printer device 3.

At this time, the control computer 2 controls a shutter 32, a display device 41 or a recording medium feed unit etc provided in the holographic stereogram printer device 3.

That is, the control computer 2 sends a control signal S1 to the shutter 32 to control the opening/closure of the shutter 32, while sending picture data D5 to the display device 41 to cause the picture corresponding to the picture data D5 to be displayed on the display device 41. The control computer 2 also sends a control signal S2 to the recording medium feed unit to control the feed operation of the holographic recording medium 30 by the recording medium feed unit.

Figure 3:
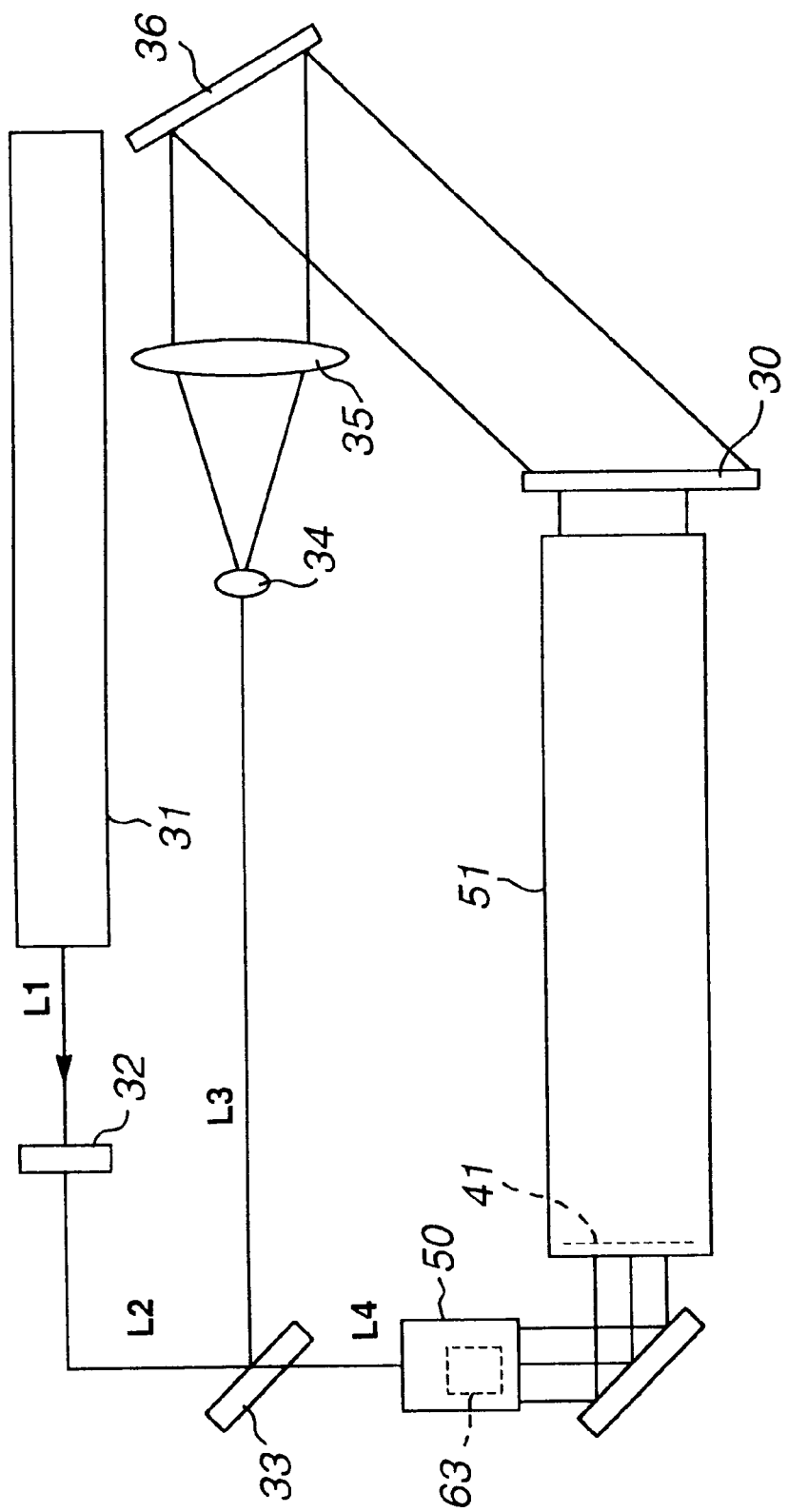
FIG. 3 shows an illustrative optical system of a holographic stereogram printing apparatus.

The holographic stereogram printer device 3 is explained in detail with reference to FIG. 3 showing an optical system of the entire holographic stereogram printer device 3 from above.

The holographic stereogram printer device 3 includes a laser light source 31 for radiating a laser light beam of a pre-set wavelength, a shutter 32 arranged on an optical axis of the laser light L1 from the laser light source 31, and a half mirror 33, as shown in FIG. 3. the laser light source 31 uses a YAG laser having a wavelength of 532 nm and an output of 400 mW.

The shutter 32 is controlled by the control computer 2 and is closed or opened when the holographic recording medium 30 is not exposed to light or exposed to light, respectively. The half mirror 33 serves for splitting the laser light Lead-in area 2 passed through the shutter 32 into reference light and object light, with the light reflected by the half mirror 33 and the light transmitted through the half mirror 33 being the reference light and the object light, respectively.

It is noted that the difference between the optical path length of the reference light reflected by the half mirror 33 to fall on the holographic recording medium 30 and that of the object light transmitted through the half mirror 33 to fall on the holographic recording medium 30 is not larger than the coherent length of the laser light source. This enhances the coherency between the reference light and the object light so that a holographic stereogram which gives a clear reproduced image can be formulated.

On the optical axis of the light L3 reflected by the half mirror 33, there are sequentially arranged a cylindrical lens 34, a collimator lens 35, for collimating the reference light, and a total reflection mirror 36 for reflecting the collimated light from the collimator lens 35.

On the optical axis of the light L4, transmitted through the half mirror 33, there is arranged an optical system for object light. This optical system for the object light is roughly classified into an optical system for picture illumination 50 and an optical system for picture projection 51.

Figure 4A:
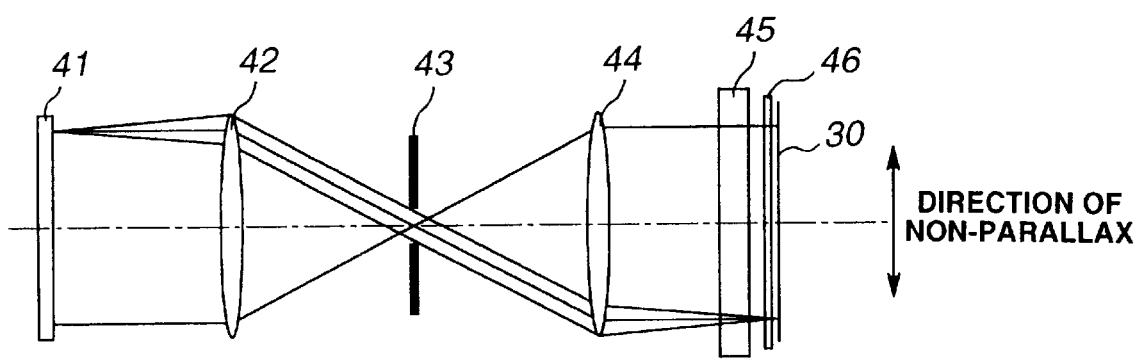
FIGS. 4A and 4B illustrate an example of a picture projecting optical system.
Figure 4B:
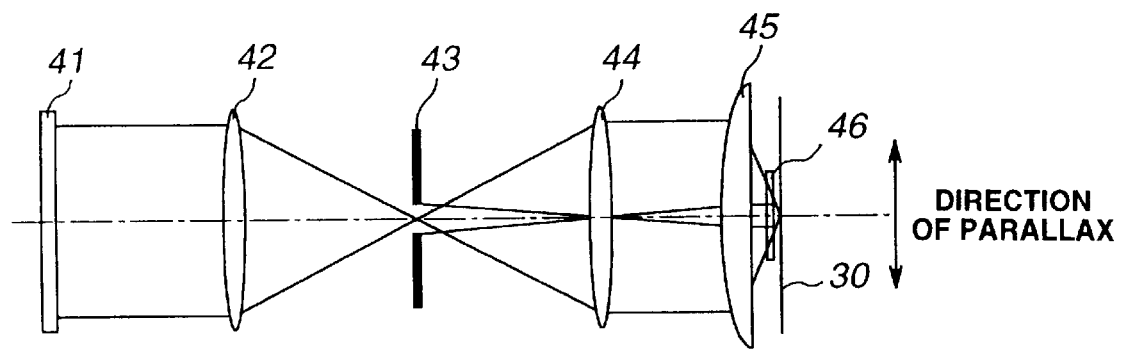

The optical system for picture projection 51 is shown in FIGS. 4A and 4B, of which FIG. 4A views the optical system from above, that is in the parallax direction or in the direction of the short axis of the element holograms and FIG. 4B views the optical system from the lateral side, that is from the non-parallax direction or in the direction of the long axis of the element holograms.

In the non-parallax direction, the picture on the display device 41 is imaged on a surface of the holographic recording medium 30 by projection lenses 42, 44, as shown in FIG. 4A. In the parallax direction, the entire light beam is collected on the holographic recording medium 30 by a cylindrical lens 45, as shown in FIG. 4B. A slit 43 arranged on the optical path serves for prohibiting the reference light from being deviated from the element holograms to expose the neighboring element hologram forming portion to light. The slit 43 is in the image forming relation with respect to the hologram surface of the holographic recording medium 30 with the interposition of the projection lens 44 and the cylindrical lens 45. The role of a one-dimensional diffusion plate 46, arranged between the cylindrical lens 45 and the holographic recording medium 30, will be explained subsequently.

Figure 5:
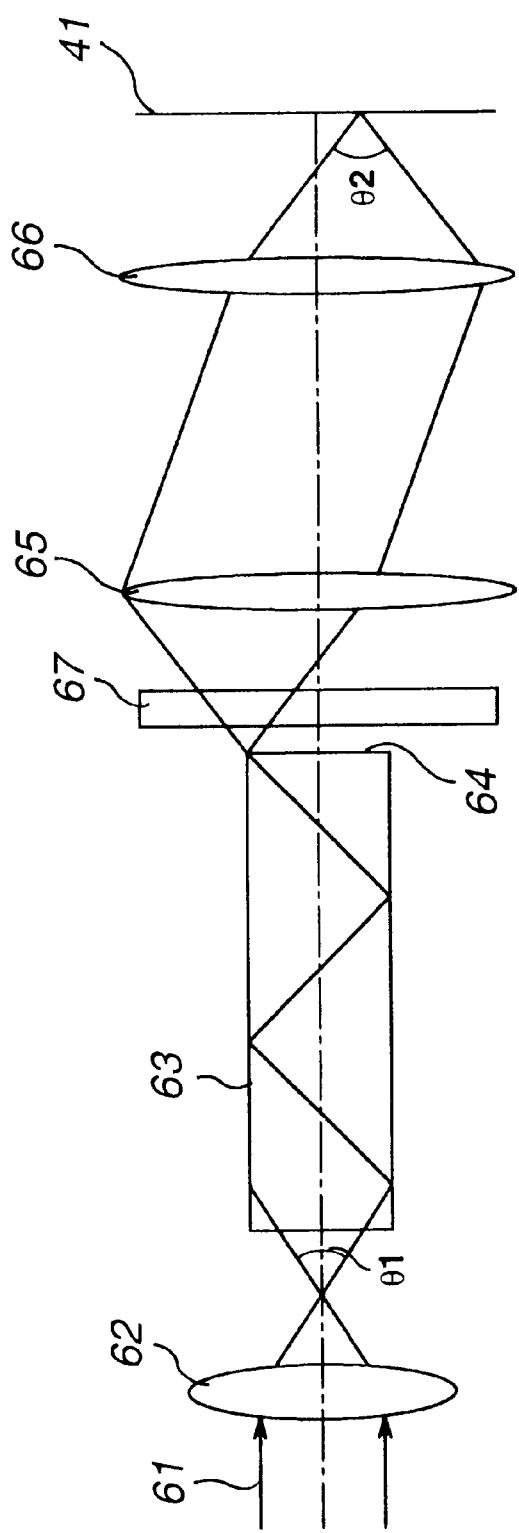
FIG. 5 similarly illustrates an example of a picture projecting optical system.

The optical system for picture illumination 50 is characteristic of the present invention. FIG. 5 shows a first embodiment of the optical system for picture illumination 50. An incident light beam 61, sent from a light source, is collected by a light condenser lens 62 to fall on a glass rod 63 constituting a rod type light integrator. The light beam is then subjected to multiple reflection within the glass rod 63 of the rod type light integrator, such that, when the beam reaches an end face 64 of the glass rod 63, the light beam is of a uniform light intensity as a result of addition of a number of light components from different directions. The projection multiplication factor A is given by the focal length ratio of the lenses 65, 66.

For correcting the rotation of the plane of polarization caused by multiple reflection occurring within the glass rod 63, a light polarizing plate 67 is arranged on the optical path.

The rod type light integrator, such as the glass rod 63, is able to control the parallelism of the incident light beam 6, besides being able to enlarging the incident light beam 61 to render the light intensity uniform. Thus, the rod type light integrator plays an important role improving the quality of the holographic stereogram.

It is noted that the parallelism required of the illuminating light of the display device 41 is determined by the slit 43 and the focal length of the lens 42, as may be seen from FIG. 4. That is, if the focal length of the lens 42, the slit width of the slit 43 and the parallelism of light are fl, w and $\theta 2$, respectively, $$2 \times fl \times \tan(\theta 2/2) = w.$$

Also, as seen from FIG. 4, $$\theta 1 = A \times \theta 2.$$

The problem which arises on application of the rod type light integrator to an optical system employing the coherent light, such as the laser light, and the method for solving the problem, are hereinafter explained.

Figure 6:
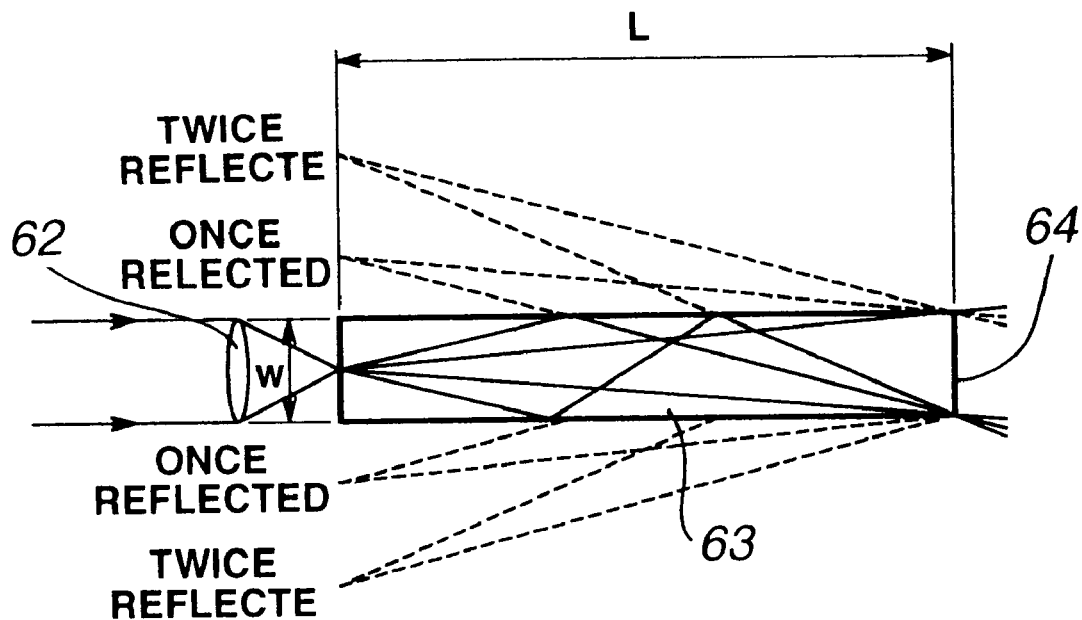
FIG. 6 shows the state of multiple reflection in a glass rod.
Figure 7:
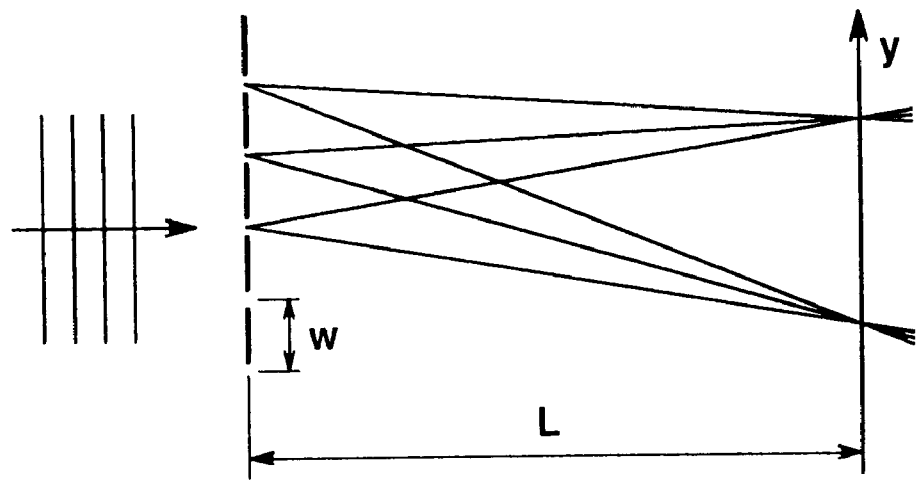
FIG. 7 shows the principle of generation of interference fringes by multiple slits.
Figure 8:
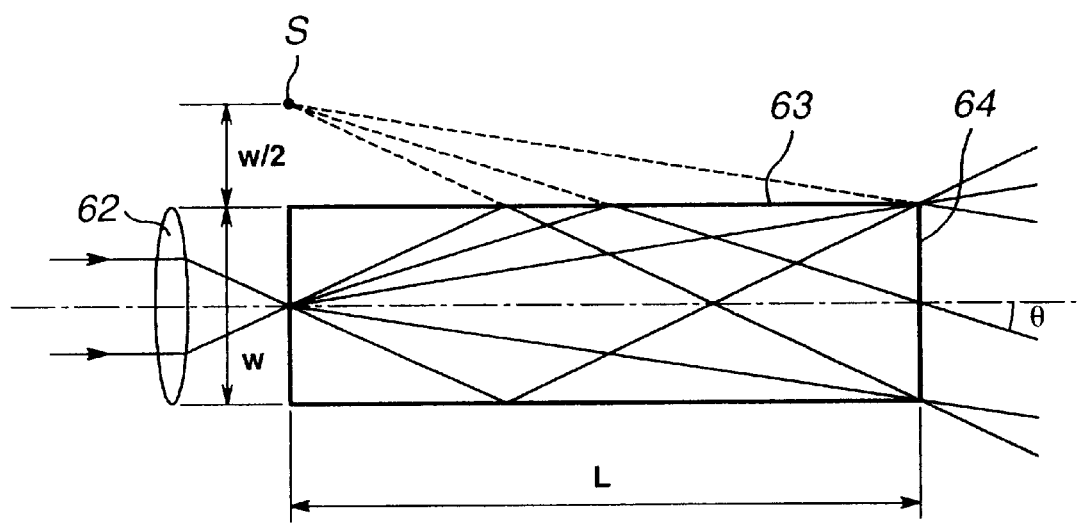
FIG. 8 shows a glass rod and a virtual point light source generated by multiple reflection in the glass rod.

If the laser light is collected and incident on the glass rod 63 of the rod type light integrator to undergo multiple reflection, as shown in FIG. 5, the light reaching the end face 64 as the light exit is equivalent to the wavefront produced when the light comes from a large number of point light sources, as shown in FIG. 6. The reason is that there are produced interference fringes similar to those produced in the multiple slits shown in FIG. 7, as a result of which interference fringes having the intensity distribution given by $$I \approx \{\sin(\pi NWY/L\lambda)/\sin(\pi WY/L\lambda)\}^2$$

is produced at the end face 64 operating as the light exit, where L and W denote the length and the thickness of the glass rod 63, respectively, as shown in FIG. 8. Also, N, $\lambda$ and Y denote the number of times of light reflection within the glass rod 63, wavelength of the laser light incident on the glass rod 63 and the position on the end face 64 of the glass rod 63, respectively.

If the refractive index of the glass rod 63 is taken into account, the spacing d of the interference fringes produced on the end face 64 of the glass rod 63 is given by $$d = \lambda \times L/(n \times W)$$

where n is the refractive index of the glass rod 63 and is usually on the order of 1.5.

The interference fringes, produced on the end face 64 of the glass rod 63, are projected by the lenses 65, 66 on the display device 41, as shown in FIG. 5. Thus, if a liquid crystal panel is used as the display device 41, a moire pattern is likely to be produced between the above-mentioned interference fringes produced by the glass rod 63 of the rod type light integrator and pixels making up a picture displayed on the liquid crystal panel. This moire pattern stands out more prominently the closer the interval between liquid crystal pixels and the interval between interference fringes.

This occurrence of the moire pattern can be evaded by a method consisting in sufficiently narrowing the interval between the interference fringes or a method not uniforming the light intensity in the parallax direction. These methods will now be explained specifically.

First, the method of sufficiently narrowing the interval between the interference fringes, as a first method for combatting the moire pattern, is explained.

Our experiments have indicated that, if the interval of the interference fringes is not larger than approximately one-half the pixel pitch of the picture displayed on the display device 41, the moire pattern ceases to stand out such that it is practically not annoying, and that, if the interval is not larger than approximately one-third of the pixel pitch, the moire pattern substantially ceases to be outstanding.

Thus, if the interval of the interference fringes produced on the end face 64 of the glass rod 63 is d, the pixel pitch of a picture displayed on the display device 41 is P and the projection multiplication factor on the display device 41 of the end face 64 of the glass rod 63 is A, it is sufficient if the relation $$d \times A < P/2$$

and more desirably the relation $$d \times A < P/3$$

be met.

It is noted that the distance d of the interference fringes is represented by $$d = \lambda \times L/(n \times W)$$

as stated previously, so that, in order to narrow the interval of the interference fringes sufficiently to render the moire pattern less prominent, it suffices if the relation $$\lambda \times L \times A/(n \times W) < P/2$$

and more desirably the relation $$\lambda \times L \times A/(n \times W) < P/3 \text{ be met.}$$

If a liquid crystal panel having the pixel pitch P of approximately 30 $\mu$m is used as the display device 41, and W, A and n are equal to 8.4 mm, 532 nm and 1.5, respectively, it suffices if the length L of the glass rod 63 is approximately 17 cm or less and desirably approximately 12 cm or less.

That is, if, under the above condition, the length L of the glass rod 63 is approximately 17 cm or less, the interval d×A of the interference fringes, projected on the display device 41, is not larger than approximately one-half the pixel pitch of the picture displayed on the display device 41, such that the moire pattern ceases to stand out to a practically acceptable extent.

Moreover, if, under the above condition, the length L of the glass rod 63 is not larger than approximately 12 cm, the interval d×A of the interference fringes, projected on the display device 41, is not larger than approximately one-third the pixel pitch of the picture displayed on the display device 41, such that the moire pattern is scarcely outstanding.

By sufficiently narrowing the interval of the interference fringes produced by the glass rod 63, the moire pattern ceased to be outstanding to render it possible to fabricate the holographic stereogram of high picture quality without being affected by the moire pattern.

However, the method of sufficiently narrowing the interval between neighboring interference fringes cannot be used depending on the particular optical systems used. The optical system for picture illumination 50 and the optical system for picture projection 51 are shown collectively in FIG. 9. Meanwhile, the light polarizing plate 67 or the one-dimensional diffusion plate 46 is not shown in FIG. 8 nor in FIGS. 10 to 13.

Figure 9:
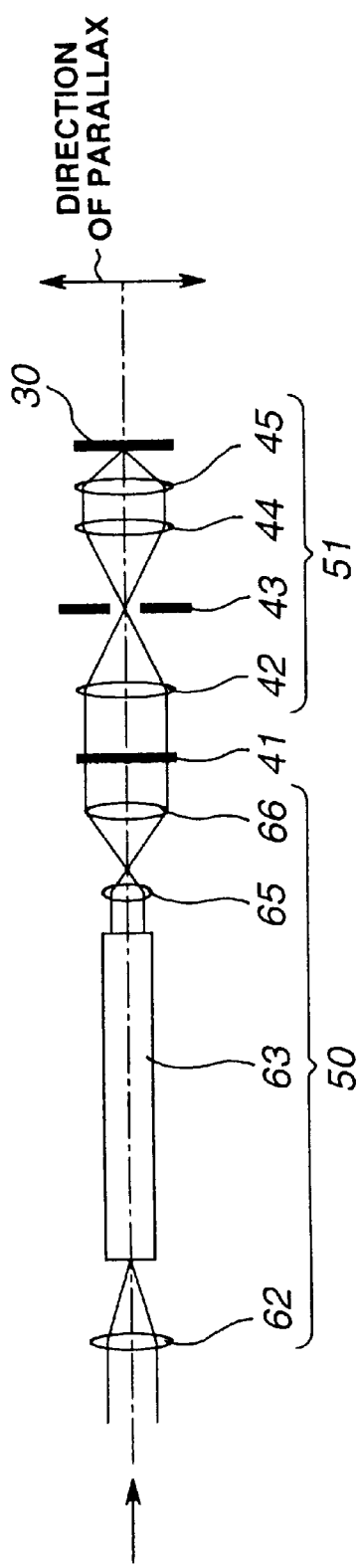
FIG. 9 shows typical examples of an optical system for picture illumination and an optical system for picture projection.

As may be seen from FIG. 9, the focal point of the light condenser lens 62, arranged ahead of the glass rod 63, the slit surface and the hologram surface are all conjugate surfaces. Therefore, an image of a virtual point light source, produced on multiple reflection in the interior of the glass rod 63, generated on multiple reflection within the glass rod 63, is also formed on the slit surface and on the hologram surface. That is, the interval between virtual image points cannot be enlarged sufficiently by parameters of the optical system. On the other hand, the method of sufficiently narrowing the interval of the interference fringes to render the moire pattern unobtrusive cannot be used depending on the particular optical systems used.

As a second method for combatting the more pattern, a method of not uniforming the light intensity in the parallax direction of the holographic stereogram for evading occurrence of moire patterns is now explained. This method can be applied without dependancy on parameters of the optical system. Therefore, this method is desirably used for an optical system to which an optical system of sufficiently narrowing the interval of the interference fringes to render the moire pattern unobtrusive cannot be used.

Figure 10:
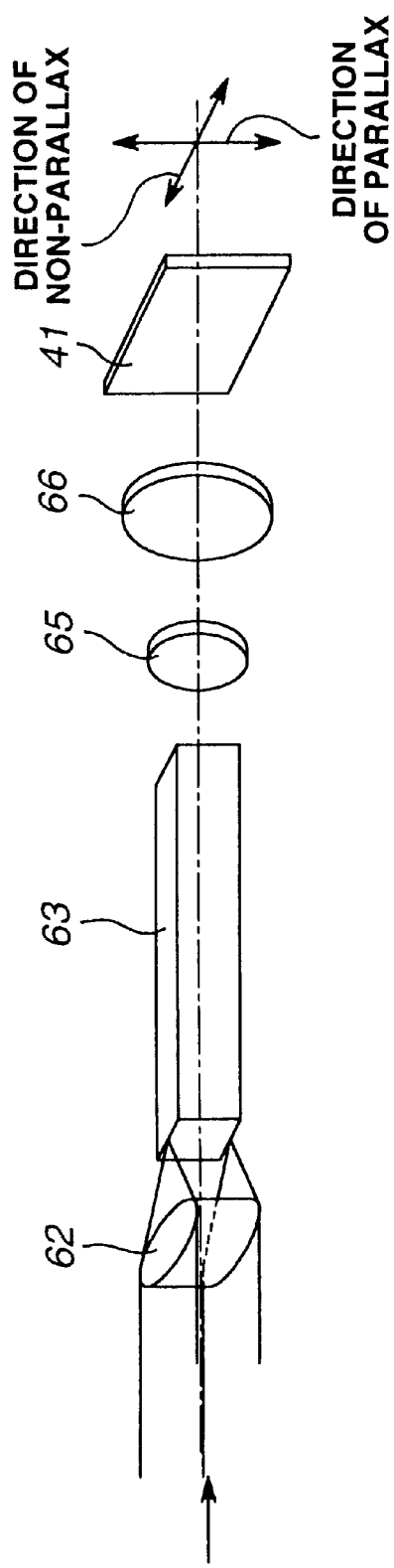
FIG. 10 illustrates a typical optical system for picture illumination in case the light intensity is rendered uniform only in the non-parallax direction to evade the occurrence of a moire pattern.

FIG. 10 shows an example of the optical system for picture illumination 50 in case the occurrence of the moire patterns is evaded by uniforming the light intensity in only in non-parallax direction of the holographic stereogram without uniforming the light in its parallax direction.

In the above-described first method, an ordinary rotation-symmetrical lens is used as the light condenser lens 62 arranged ahead of the glass rod 63 when introducing the light into the glass rod 63. In the present method, a cylindrical lens collecting the incident light only in the non-parallax direction is used as the light condenser lens 62 arranged ahead of the glass rod 63, as shown in FIG. 10.

If the cylindrical lens collecting the incident light only in the non-parallax direction is used as the light condenser lens 62 arranged ahead of the glass rod 63, multiple reflection occurs in the inside of the glass rod 63 in the non-parallax direction to uniform the light intensity. However, such multiple reflection fails to occur in the parallax direction such that light intensity is not uniformed. In such case, multiple reflection fails to occur in the parallax direction and hence there occurs no interference fringe as a result of multiple reflection in the glass rod 63. The result is evasion of the occurrence of moire patterns.

Since the light intensity is not uniformed in the parallax direction if the present method is applied t evade the moire patterns, it may be an occurrence that the produced holographic stereogram observed at a certain angle with respect to the parallax direction undergoes slight variation in brightness. However, since variations in brightness in this direction is usually not obnoxious, there is produced only little inconvenience by not uniforming the light intensity.

Figure 11:
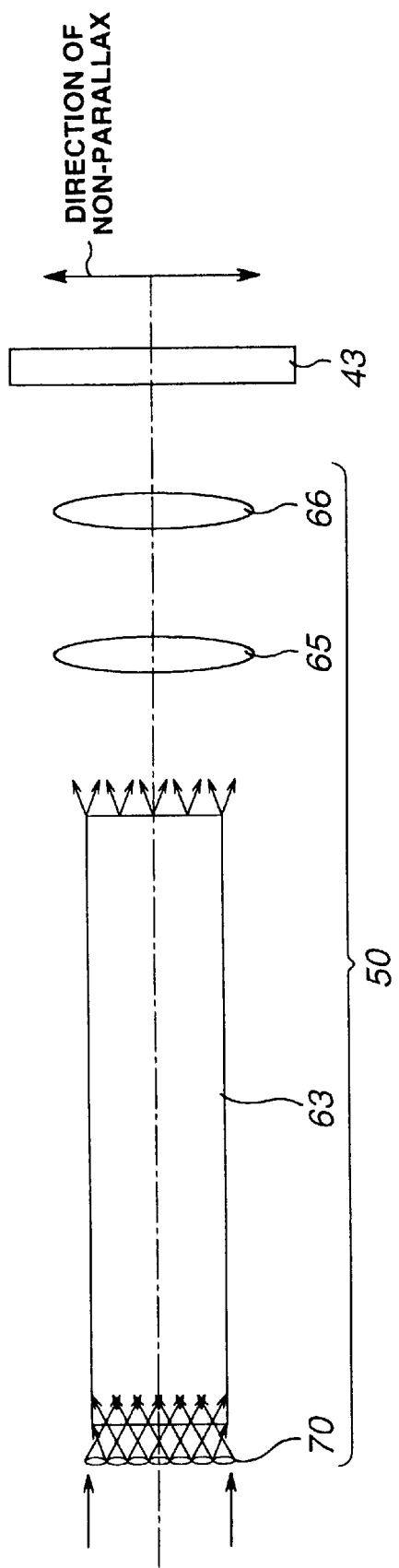
FIG. 11 shows a typical optical system for picture illumination employing a reticular lens as a lens arranged ahead of the glass rod.

The second embodiment of the optical system for picture illumination 50 is explained with reference to FIGS. 11 to 13.

In the optical system for picture illumination 50 given as the second embodiment, a reticular lens 70 is used as the lens arranged ahead of the glass rod 63, in place of the light condenser lens 62 in the first embodiment shown in FIG. 5. That is, the light integrator is constituted by the combination of the glass rod 63 and the reticular lens 70. In this case, the reticular lens 70 is arranged to have the refractive power in the non-parallax direction. This uniforms the light intensity in the non-parallax direction.

If the reticular lens 70 is used as the lens arranged ahead of the glass rod 63, there is obtained an advantage that the interference fringes by the virtual point light source as explained in connection with the first embodiment is less obtrusive to the eye.

Figure 12A:
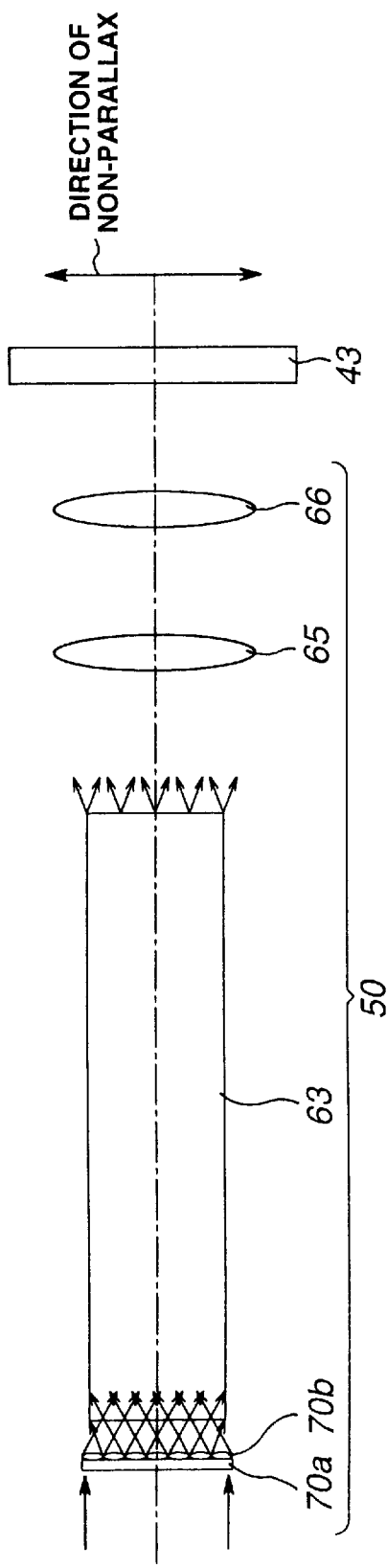
FIGS. 12A and 12B show a typical optical system for picture illumination employing a pair of reticular lenses as lenses arranged ahead of the glass rod.
Figure 12B:
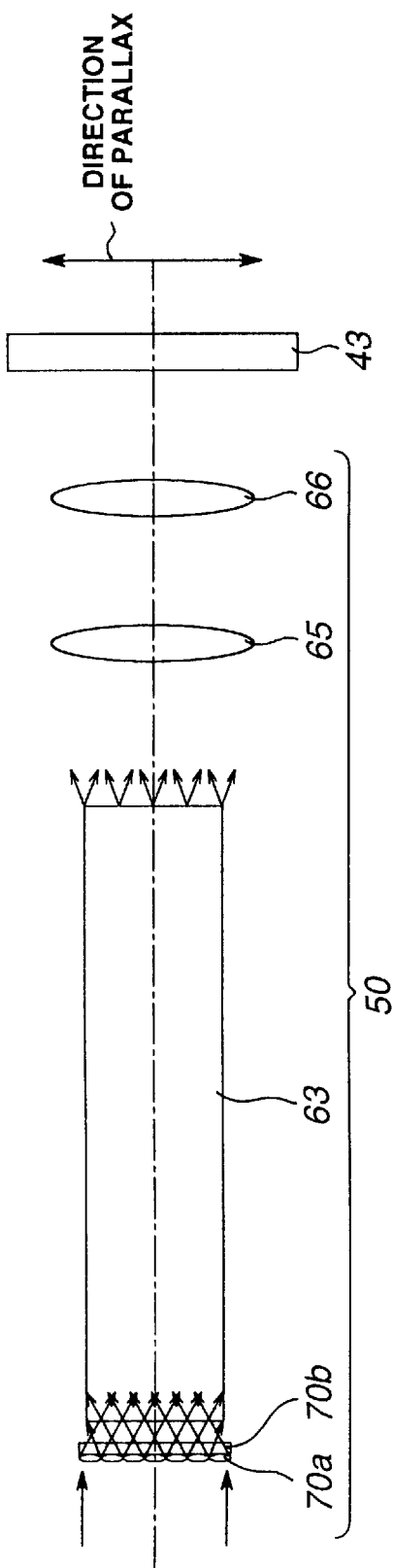

If the reticular lens is used as a lens arranged ahead of the glass rod 63, paired reticular lenses 70a, 70b may be arranged so that the light collecting directions of these lenses 70a, 70b lie at right angles to each other. That is, the reticular lens 70b having the refractive power in the non-parallax direction as shown in FIG. 12A may be arranged ahead of the glass rod 63 in combination with the reticular lens 70a having the refractive power in the parallax direction, as shown in FIG. 12B.

By employing the paired reticular lenses 70a, 70b, it is possible to uniform not only the light intensity in the non-parallax direction but also the light intensity in the non-parallax direction. Moreover, if the reticular lens 7 is used as a lens arranged ahead of the glass rod 63, there is obtained a merit that the interference fringes due to the virtual point light source as explained in connection with the first embodiment are not visually obtrusive, so that, if the paired reticular lenses 70a, 70b are used to uniform the light intensity in the non-parallax direction and that in the parallax direction, there are scarcely produced interference fringes, thus evading the occurrence of moire patterns.

Meanwhile, if the paired reticular lenses 70a, 70b are used, as shown in FIG. 12, the refractive power of the reticular lenses 70a, 70b are preferably set independently to optimum values as determined by the particular optical system used. Specifically, the refractive power of the reticular lens 70a (refractive power in the parallax direction, that is the refractive power along the short axis of the element holograms) is selected to be different from that of the reticular lens 70b (refractive power in the non-parallax direction, that is the refractive power along the long axis of the element holograms) so that the respective refractive powers are optimum values as determined by the particular optical system used.

Figures 13A, 13B:
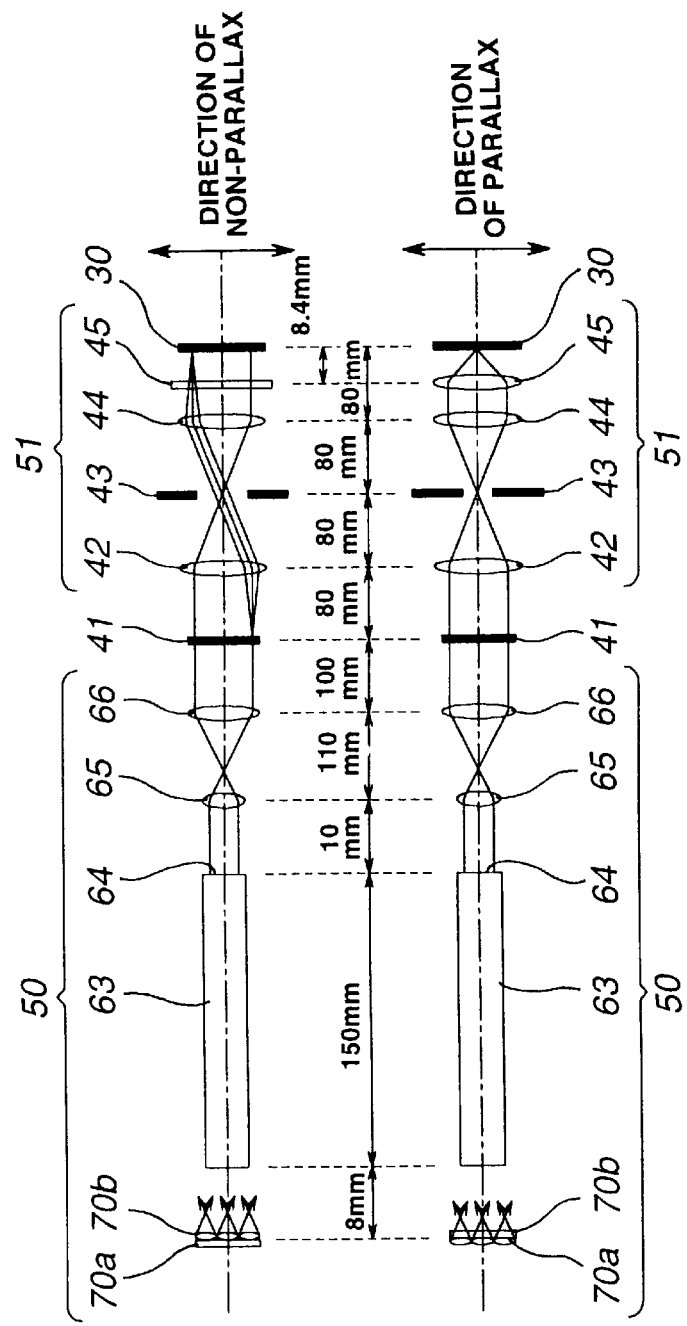
FIGS. 13A and 13B show a typical optical system for object light employing a pair of reticular lenses as lenses arranged ahead of the glass rod.

FIG. 12 shows a specified example of the optical system of an object light portion of the holographic stereogram printer device to which the above-described second embodiment of the optical system for picture illumination 50 is applied. FIG. 13A views the optical system of the optical system for the object light from above, that is in the parallax direction (short axis direction of the element holograms). FIG. 13B views the optical system of the optical system for the object light from a lateral side, that is in the parallax direction (short axis direction of the element holograms). In FIG. 13, particular numerical values of the parameters of the optical system are also shown.

In such optical system, the light beam has a spreading angle in the non-parallax direction by the laser light passing through the reticular lens 70b.

The spreading angle in the non-parallax direction, produced by the laser light passing through the reticular lens 70b, has a broader degree of freedom than the spreading angle in the parallax direction, and hence may have a significantly large angular magnitude. Our experiment indicated that the spreading angle by the reticular lens 70b of 20° or more gives improved uniformity on the whole insofar as the non-parallax direction is concerned.

Thus, as this reticular lens 70b, such a lens having the lens pitch angle of 20 μm and the spreading angle of 40° is used. This gives a holographic stereogram uniformed in the light intensity in the non-parallax direction and having excellent picture quality.

By having the laser light passed through the reticular lens 70a, the light beam may have a spreading angle in the parallax direction, as shown in FIG. 13B.

The spreading angle in the parallax direction, produced by the laser light passing through the reticular lens 70a, can be set by the width of the element holograms formed in the holographic stereogram 30 and by the parameters of the present optical system.

For example, the width of the element holograms formed in the holographic recording medium 30 is set to 0.2 mm. If, at this time, the focal length f of the projection lens 44 is set to 80 mm and the focal length f of the cylindrical lens 45 is 8.4 mm, the slit width of the slit 43 needs to be set to 0.2×80/8.4≈1.905 mm. With the focal length f of the projection lens 44 of 80 mm, the illuminating light incident on the display device 41 needs to have a spreading angle of $\tan^{-1}(1.905/80) \approx 1.364°$ if the light is to be diffused sufficiently in the slit portion of the slit 43. At this time, the projection multiplication factor A to the display device 41 of the end face 64 of the glass rod 63 is 10 (A=10). It is therefore desirable that the spreading angle in the parallax direction by the reticular lens 70a of the order of approximately 13.64° is desirable.

If the spreading angle in the parallax direction by the reticular lens 70a is larger excessively than the theoretical value, calculated as described above, the light kicked by the slit 43 is increased to worsen the light utilization efficiency. Conversely, if the spreading angle is smaller than the theoretical value, the element hologram forming portions are not evenly illuminated by light, thus worsening the picture quality of the holographic stereogram. It is therefore desirable to use the reticular lens 70a having the spreading angle in the parallax direction as close to the above-mentioned theoretical value as possible.

In actuality, however, the above spreading angle need not be strictly equal to the theoretical value because the effect of aberration is operating in this respect. The present inventors have prepared the holographic stereogram, under the above conditions, using a lens having the lens pitch of 200 μm and the focal length of approximately 1 mm, as the reticular lens 70a, and have found that a sufficient light utilization efficiency can be realized simultaneously with the sufficient picture quality.

In the above example, the paired reticular lenses 70a, 70b are arranged ahead of the glass rod 63. Alternatively, a fly-eye lens may be arranged ahead of the glass rod 63 in place of these paired reticular lenses 70a, 70b. That is, the fly-eye lens and the glass rod 63 may be combined to constitute the light integrator.

If the fly-eye lens and the glass rod 63 are combined to constitute the light integrator, the fly-eye lens preferably has the refractive power along the long axis of the element hologram different from that along its short axis so that the reflective powers of the fly-eye lens in the respective directions will be optimum values as determined by the particular optical system used.

Meanwhile, a light polarizing plate is preferably arranged at back of the glass rod, no matter whether the reticular lens and the glass rod or the fly-eye lens and the glass rod are combined together to constitute the light integrator. By arranging the light polarizing plate, no matter whether the reticular lens or the fly-eye lens is used, it is possible to correct the rotation of the polarization plane in the glass rod caused by multiple reflection to align the polarization planes of the light beam.

The above-described optical system for picture illumination 50 and optical system for picture projection 51 are optical systems characteristic of the present invention. The light traversing the optical system for picture illumination 50 and the optical system for picture projection 51 is uniformed in the in-plane distribution of the light intensity to reach the holographic recording medium 30 to expose it to light, the exposure to light of the holographic recording medium 30 is explained with reference to FIG. 3.

In preparing the reflection type holographic stereogram, it is a usual practice to arrange the one-dimensional diffusion plate directly ahead of the holographic recording medium 30. Thus, in the present embodiment the one-dimensional diffusion plate 46 is arranged directly ahead of the holographic recording medium 30. This one-dimensional diffusion plate 46 diffuses the collected object light one-dimensionally along the longitudinal direction of the strip-shaped element holograms to provide an angle of view in the vertical direction (longitudinal direction).

Although the one-dimensional diffusion plate 46 may be provided in a stationary state, it may also be moved whenever each element hologram is exposed to light, in order to remove the noise fixed on the hologram surface. For moving the one-dimensional diffusion plate 46, the strip-shaped element holograms are preferably moved along the long-axis direction in order to remove any streaks produced in the parallax direction of the holographic stereogram.

The display device 41, which is a picture display device of the light transmission type formed by, for example, a liquid crystal panel, is controlled by the control computer 2, to display a picture corresponding to data D5 sent from the control computer 2. In preparing the holographic stereogram, the present inventors used a monochromatic liquid crystal panel of 480×1068 pixels and 16.8 mm×29.9 mm in size as the display device 41.

The picture displayed on the display device 41 is projected by the optical system for picture projection 51 on the holographic recording medium 30. By having the projected light (that is the object light) and the reference light illuminated simultaneously on the holographic recording medium 30, interference fringes of the object light and the reference light are recorded as strip-shaped element holograms on the holographic recording medium.

This recording of the strip-shaped element holograms is sequentially carried out for each picture making up the string of the parallax pictures. The element holograms are moved stepwise, by a recording medium feed unit, at a pitch of one element hologram, each time the light exposure of the sole element hologram comes to a close, so that the respectable element holograms associated with the respective pictures making up the string of the parallax pictures will be arrayed in the parallax direction. This produces the holographic stereogram comprised of the element holograms sequentially formed on the holographic recording medium 30.

The present invention is not limited to the above-described different embodiments, which are given only by way of illustrative embodiments.

For example, although the foregoing description is made with reference to a holographic stereogram having only the parallax in the horizontal direction, that is to a holographic stereogram having the strip-shaped element holograms, the present invention may be similarly applied to a holographic stereogram composed of rectangular or circular dot-shaped element holograms and having the parallax in both the vertical and horizontal directions.

Although the above description has been made with reference to a reflection type holographic stereogram, the present invention may similarly be applied to a transmission type holographic stereogram or to an edge-trigger type holographic stereogram.

Although the lenses for collecting the light on the glass rod 63 (lens 62, reticular lens 70 and reticular lenses 70*a*, 70*b*) are fixed, these may be moved, similarly to the one-dimensional diffusion plate 46, each time the element hologram is exposed to light. By moving the lens for collecting the beam on the glass rod 63 each time the element hologram is exposed to light to reduce the noise fixed at an infinitely remote point on fabrication of the holographic stereogram.

In the foregoing description, a glass rod is used as the light integrator. Alternatively, another sort of the light integrator may also be used for achieving similar effects.

Figure 14:
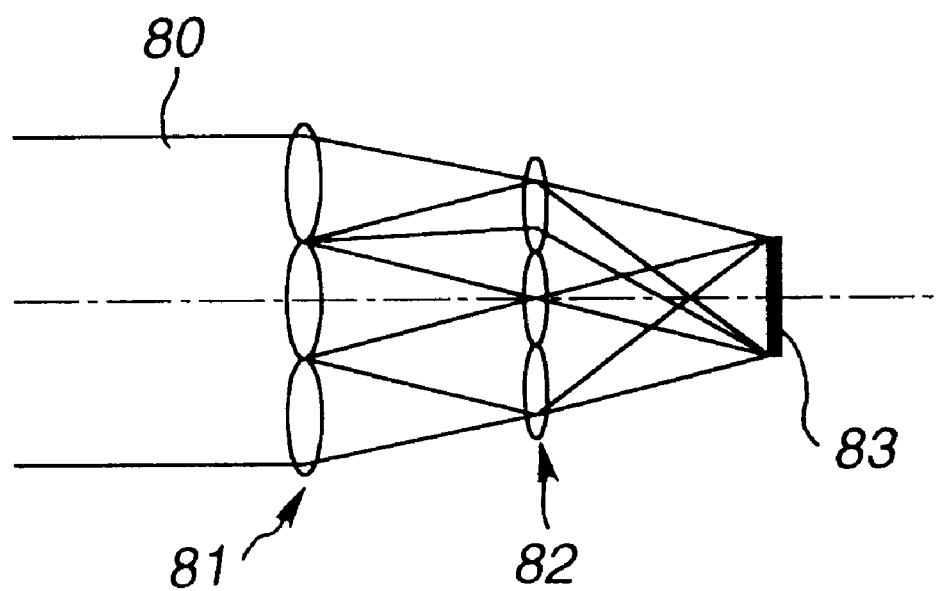
FIG. 14 shows the structure of a fly-eye type light integrator.

As this other light integrator, there is a light integrator employing a fly-eye lens. The light integrator employing a fly-eye lens, frequently used for uniforming the light intensity in, for example, a stepper as a semiconductor light exposure device, is configured as shown in FIG. 14. That is, the incident light beam 80 is caused to fall on fly-eye lenses 81 and images of the fly-eye lenses 80 are formed on other fly-eye lenses 82. By changing the constants of the fly-eye lenses 81, 82, it is possible to project the images of the plural fly-eye lenses 81 on an object for illumination 83 in an overlapping manner. By projecting the beams in an overlapping manner, it is possible to eliminate the non-uniformity of the incident light beam 80 to uniform the light intensity. Similarly to the rod type light integrator, this fly-eye type light integrator may be applied to the present invention.

Although only one laser type is used in the above-described embodiment to prepare the monochromatic holographic stereogram, the present invention may be applied to the preparation of the color holographic stereogram using three color laser. Since the light utilization efficiency can be improved by application of the present invention, it is possible to formulate a more realistic color hologram printing apparatus can be formulated using three small-sized laser devices.

What is claimed is:

1. A holographic stereogram printing apparatus for recording strip-shaped or dot-shaped element holograms from a sequence of pictures having parallax between them, comprising:

a laser source for radiating a laser light beam;

a half mirror for splitting said laser light beam into an object beam and a reference beam;

illuminating means for processing said object beam to uniformly illuminate a display device; said display device displaying a picture to be recorded as a hologram; said illuminating means including a condensing lens followed by a rod-type light integrator; said rod-type light integrator being designed such that multiple internal reflection interference fringes appearing at said display device are spaced to be less than half the pixel pitch of said display device;

projection means for projecting an image of the displayed picture onto a holographic recording medium; said image being produced by processing said object beam transmitted through said display device; said projection means including a one-dimensional diffusion plate; and holographic recording means containing said holographic recording medium for sequentially recording holograms formulated by superimposing said reference beam with the projected image of said pictures onto the recording medium.

2. The holographic stereogram printing apparatus according to claim 1, wherein said condensing lens is a cylindrical lens which produces uniform illumination of said display device only in the non-parallax direction.

3. The holographic stereogram printing apparatus according to claim 1, wherein said condensing lens is a reticular lens which produces uniform illumination of said display device only in the non-parallax direction.

4. The holographic stereogram printing apparatus according to claim 3, wherein said reticular lens is a fly-eye type lens.

5. The holographic stereogram printing apparatus according to claim 1, wherein said condensing lens is a pair of reticular lenses each with a different spreading angle such that the projected image is uniformly illuminated.

6. The holographic stereogram printing apparatus according to claim 1, wherein said illumination means further includes a polarization plate following said rod-type light integrator for correcting polarization rotation caused by multiple reflections within the rod.

* * * * *